March 31, 1925.
F. H. EDMONDS
POTATO DIGGER
Filed Sept. 26, 1923
1,531,907
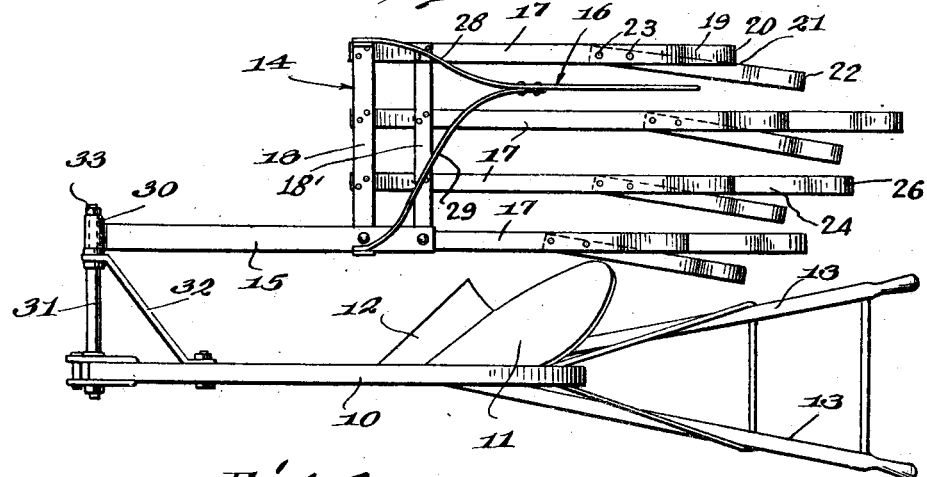
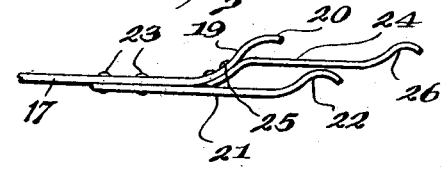
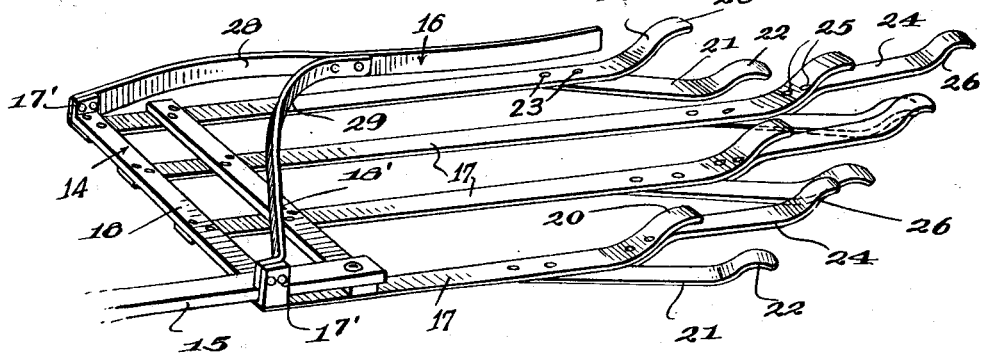
INVENTOR
F. H. Edmonds
BY
ATTORNEYS Patented Mar. 31, 1925.

1,531,907

UNITED STATES PATENT OFFICE.

FREDERICK HENRY EDMONDS, OF BOARDMAN, OREGON.

POTATO DIGGER.

Application filed September 26, 1923. Serial No. 664,965.

*To all whom it may concern:*

Be it known that I, FREDERICK HENRY EDMONDS, a citizen of the United States, and a resident of Boardman, in the county of Morrow and State of Oregon, have invented certain new and useful Improvements in Potato Diggers, of which the following is a specification.

This invention relates to a potato digger. The invention more particularly relates to an attachment for plows whereby to enable said plow to be utilized as a potato digger.

The object of the invention is to provide an attachment of the above character which may be secured in an easy and expeditious manner to any conventional type of moldboard plow and in receiving relation to the earth or soil turned by the moldboard of said plow.

A further object of the invention is that it is adapted to separate potatoes from the earth or soil which may be deposited thereon from the plow to which the attachment may be secured in a highly efficient manner.

Other objects and advantages relating to details of construction, combination and arrangement of parts will hereinafter appear in the detailed description to follow.

The invention is illustrated by way of example in the accompanying drawings, in which:

Figure 1 is a top plan view, showing a moldboard plow and an attachment of the present invention secured thereto;

Figure 2 is a perspective view of an attachment embodying the present invention; and Figure 3 is a fragmentary view in side elevation particularly illustrating the construction of one of the separating bars together with the prongs and runner or heel carried thereby employed in the construction of the attachment.

Referring to the drawings more particularly, in Figure 1 there is shown a conventional form of moldboard plow of which 10 is the beam, 11 the moldboard, 12 the point and 13 the handles.

The attachment of the present invention comprises a rack generally designated by the reference character 14, a drag link or bar 15 and a baffle member 16. The rack 14 more specifically comprises a plurality of bars 17 which may be of any suitable strap iron or rods and which are tied together at their forward ends by the two cross members 18 and 18'. The cross member 18 has each end turned upwardly as at 17'. The bars 17 are spaced substantially as shown and the rear end of each bar 17 is provided with an upwardly curved portion 19 as best shown in Fig. 3. The upwardly curved portion 19 in each instance terminates in a substantially horizontal portion 20. To the rear end of each bar or strap 17 there is secured what may be termed a heel or runner 21, said heel or runner as shown being in the form of a strap or bar and having its rear end terminating in an upwardly and then rearwardly extending portion, as at 22. Each strap 21 is secured to the associated strap 17 by means of rivets or the like, as indicated at 23, and each strap 21 extends at an angle to the longitudinal axis of the associated strap 17 that is the strap 21 in each instance extends inwardly with relation to the strap or bar 17 to which the same is secured. With the exception of the outermost bar or strap 17 each of the remaining bars 17 has secured thereto a prong or bar member 24. This bar member has its forward end turned downwardly and secured by means of rivets or the like, as at 25, to the upwardly extending portion 19 of the associated bar 17. The rear end portion of each prong 24 is turned upwardly and then downwardly, as at 26.

The baffle member 16 comprises two straps 28 and 29, said strap 28 having its forward end secured to the outer upward turned end of bar 18 and upon the outer side of the rack. This strap extends inwardly and then rearwardly as best shown in Fig. 1 and is adapted to serve to prevent potatoes rolling from the rack 14 as plow proceeds forwardly. The strap 29 has its one end secured to an intermediate portion of the strap 28, as shown in Figure 2, and its other end secured to the inner and upward turned end of bar 18 and this strap serves to brace the strap 28 and also prevents potatoes rolling forward. It also may be mentioned that the strap 28 is of resilient material in order to increase its operative efficiency.

The member 15 has its rear end bolted to the inner ends of the cross bars 18 and 18' and the forward end of this link is formed with an integral sleeve 30. From the forward end of the plow beam 10 there is extended a bolt 31, said bolt being suitably secured against longitudinal movement and braced by the bar 32. The outer end of this bolt is extended to the sleeve 30 of the drag link or bar 15 and the sleeve 30 is removably held upon the bar by a nut 33.

As is obvious a plow of conventional construction and of the type shown may be easily provided with suitable means for connecting the attachment of the present invention, that is the bolt 31 heretofore described.

In the use of the device, the plow should be drawn so that the same will turn the soil containing potatoes; that is, the plow should be guided so that the ridge representing a row of potatoes will be turned by the moldboard 11 and deposited upon the rack 14. As the plow proceeds forwardly the potatoes and earth will of course pass rearwardly upon the rack 14. The rack 14 preferably engages the ground over which the same passes. As the potatoes pass rearwardly upon the rack 14 the same will be elevated when reaching the upwardly extending portions 19 of the bars 17 and also these upwardly extending portions 19 together with the rearwardly extending portions 20 of these bars will aid to break up soil and separate the potatoes from the soil. Furthermore, the runners or heels 21 will give a spring like support to the rear ends of the bars 17 and thus in a way serve to vibrate the rack 14 as a whole and in this way more efficiently separate the soil from the potatoes. The prongs 24 will likewise further aid in separating the potatoes from the associated soil and upon the soil and potatoes being deposited at the rear of the rack 14 the potatoes will be principally upon the top surface of the soil and in this way can be easily gathered.

I claim:

1. In combination with a plow of the character described, a rack comprising a plurality of elongated bars arranged in spaced relation, means whereby said bars may be secured to each other and also secured to said plow so that the rack will move adjacent the moldboard of the plow, and a heel secured to the rear end of each of the bars whereby to elevate the same.

2. In combination with a plow of the character described, a rack comprising a plurality of elongated bars arranged in spaced relation, means whereby said bars may be secured to each other and also secured to said plow so that the rack will move adjacent the moldboard of the plow, angularly extending prongs at the rear end of said bars, and a curved baffle member arranged in a curved and elongated relation to said bars, for the purpose described.

3. A potato gathering attachment for a potato digger, comprising a frame including a plurality of elongated and parallel arranged bars with the forward ends secured together and a heel for the rear end of each bar, each heel comprising a bar having its one end secured to its associated bar of the frame and bent intermediate its ends to provide a ground engaging surface or heel.

4. A potato gathering attachment for a potato digger, comprising a frame including a plurality of elongated and parallel arranged bars with the forward ends secured together and a heel for the rear end of each bar, each heel comprising a bar having its one end secured to its associated bar of the frame and bent intermediate its ends to provide a ground engaging surface or heel, and extensions carried by the rear end of the frame bars, said extensions being in off-set relation to the top face of the bars.

5. An attachment of the character described, comprising a frame adapted to be secured to a plow and in receiving relation to the soil which may be lifted by the plow, and a curved baffle member extending across the forward end of the frame and rearwardly.

FREDERICK HENRY EDMONDS.